(12) United States Patent
McKeeth (10) Patent No.: US 7,523,400 B2
(45) Date of Patent: Apr. 21, 2009

(54) TEXT BASED MARKUP LANGUAGE RESOURCE INTERFACE

(75) Inventor: James McKeeth, Sampa, ID (US)

(73) Assignee: Micron Technology, Inc., Boise, ID (US)

(*) Notice: Subject to any disclaimer, the term of this patent is extended or adjusted under 35 U.S.C. 154(b) by 13 days.

(21) Appl. No.: 11/595,390

(22) Filed: Nov. 10, 2006

(65) Prior Publication Data
US 2007/0061697 A1 Mar. 15, 2007

Related U.S. Application Data

(62) Division of application No. 09/349,735, filed on Jul. 8, 1999.

(51) Int. Cl.
*G06F 3/00* (2006.01)
(52) U.S. Cl. ............................ 715/749; 715/760
(58) Field of Classification Search ........... 715/705, 715/741, 748, 749, 760
See application file for complete search history.

(56) References Cited

U.S. PATENT DOCUMENTS

| | | | |
|---|---|---|---|
| 4,819,162 A | 4/1989 | Webb, Jr. et al. | |
| 4,881,230 A | 11/1989 | Clark et al. | |
| 5,010,551 A | 4/1991 | Goldsmith et al. | |
| 5,068,787 A | 11/1991 | Pipella et al. | |
| 5,182,705 A | 1/1993 | Barr et al. | |
| 5,459,657 A | 10/1995 | Wynn et al. | |
| 5,493,492 A | 2/1996 | Cramer et al. | |
| 5,508,977 A | 4/1996 | Tymn | |
| 5,646,839 A | 7/1997 | Katz | |
| 5,696,702 A | 12/1997 | Skinner et al. | |
| 5,710,887 A | 1/1998 | Chelliah et al. | |
| 5,715,374 A | 2/1998 | Heckerman et al. | |
| 5,720,001 A | 2/1998 | Nguyen | |
| 5,764,916 A | 6/1998 | Busey et al. | |
| 5,771,354 A | 6/1998 | Crawford | |
| 5,784,539 A | 7/1998 | Lenz | |

(Continued)

OTHER PUBLICATIONS

Brandy, B. and B. Smith, Software Product Description and Features, 12 pages, Copyright 1996, "YAK—Winsock Personal Chat Program and Multi-Document Text Editor—Version 1.0 beta."

(Continued)

*Primary Examiner*—Weilun Lo
*Assistant Examiner*—Truc T Chuong
(74) *Attorney, Agent, or Firm*—Knobbe, Martens, Olson & Bear, LLP (57) ABSTRACT

A software control method and apparatus for displaying a text based markup language interface. The interface can interact with a computer to provide reference documents, install system drivers and perform various system utilities. The interface can reference optical drivers, hard disk drives or other storage medium and files available over a network, such as a local area network (LAN) or a wide area network (WAN) including the Internet. A graphical user interface using a text markup language such as hypertext markup language (HTML) can allow for activation for a user interactive control such as an icon or a hyperlink. Activation of an interactive control can hook onto a hypertext link target associated with the activated user interactive control result in the performance of an initial action responsive to variables including the control, a uniform resource locator associated with the interactive control and the hypertext link target.

17 Claims, 8 Drawing Sheets

U.S. PATENT DOCUMENTS

| | | | |
|---|---|---|---|
| 5,802,493 | A | 9/1998 | Sheflott et al. |
| 5,802,504 | A | 9/1998 | Suda et al. |
| 5,838,682 | A | 11/1998 | Dekelbaum et al. |
| 5,842,181 | A | 11/1998 | Fanjoy |
| 5,870,559 | A | 2/1999 | Leshem et al. |
| 5,884,045 | A | 3/1999 | Kurihara |
| 5,903,642 | A | 5/1999 | Schwartz et al. |
| 5,915,010 | A | 6/1999 | McCalmont |
| 5,918,207 | A | 6/1999 | McGovern et al. |
| 5,970,468 | A | 10/1999 | Bull |
| 5,982,372 | A | 11/1999 | Brush et al. |
| 6,014,658 | A | 1/2000 | Pretz |
| 6,031,528 | A | 2/2000 | Langfahl, Jr. |
| 6,061,695 | A | 5/2000 | Slivka et al. |
| 6,080,207 | A | 6/2000 | Kroening et al. |
| 6,104,334 | A | 8/2000 | Allport |
| 6,141,699 | A | 10/2000 | Luzzi et al. |
| 6,144,962 | A | 11/2000 | Weinberg et al. |
| 6,167,567 | A | 12/2000 | Chiles et al. |
| 6,216,141 | B1 | 4/2001 | Straub et al. |
| 6,367,008 | B1 | 4/2002 | Rollins |
| 6,442,714 | B1 | 8/2002 | Griffin et al. |
| 6,457,123 | B1 | 9/2002 | Rollins |
| 6,694,314 | B1 * | 2/2004 | Sullivan et al. ............... 707/10 |

OTHER PUBLICATIONS

Office of Automation Concepts Implementation, User's Guide, pp. 1-17, Oct. 11, 1982, "Palm 3."

Palm Sample Printouts, 4 pages, Date Unknown.

U.S. Patent & Trademark Office, Manual of Patent Program Procedure, vol. 2, pp. 1-19, Oct. 31, 1989, "Examination Clerical Procedure."

U.S. Patent & Trademark Office, Form PTO 690E, U.S. Government Printing Office, 1995, "Examiner's Bi-Weekly Time Worksheet,"

Micron Electronics, Inc.—Assignee, U.S. Appl. 08/964,943, Filed Nov. 4, 1997, "Method and System for Providing Remote Sales and Technical Support with Face the Customer Feature,"

Micron Electronics, Inc.—Assignee, U.S. Appl. 09/288,215, Filed Apr. 8, 1999, "Method and System for Providing Remote Sales and Technical Support with Face the Customer Feature."

* cited by examiner

TEXT BASED MARKUP LANGUAGE RESOURCE INTERFACE

This application is a divisional of U.S. application Ser. No. 09/349,735, filed Jul. 8, 1999, the entirety of which is hereby incorporated herein by reference.

BACKGROUND

The present invention relates to computer software utility programs, and more specifically to a text based user interface for accessing computer utilities and reference materials.

Product vendors and technical support services are often looking for new ways to provide more accurate and efficient technical support for computer systems. Providing customer service involves a cost of doing business to a vendor or service provider. The goal of a business is to provide an optimal amount of customer service, resulting in a satisfied customer base, at the lowest possible cost. Service cost and customer frustrations often increase as the time to reach a resolution of a customer's problem increases. Time to resolution can be dependent upon a variety of factors.

One method of effectuating a solution to a customer's problem includes having a support person "walk through" a routine with a user during a telephone conversation. However, this can be inefficient because users are often unfamiliar with the types of routines that must be performed and don't have the access to the technical information required to accomplish a desired task.

Another approach that includes performing diagnostics remotely utilizes a dedicated software package to enable a remote technician to connect via modem and essentially control a computer from a remote site. However, that solution typically requires that proprietary software be running at both the remote site and the service location. In addition a learning curve for teaching a user at the remote site how to set up and operate the proprietary software must also be considered.

Problems can be aggravated by waiting for a technician to attend a problem that could be best remedied by the customer, if the customer had the resources available to effectuate the solution. Therefore it is preferable to make resources available to a customer to facilitate the customer solving a problem with their computer. Resources can include system manuals, Technical Support bulletins and drivers.

It has been known to create reference CD ROMs containing support resources and to distribute the reference CDs to customers. Typically the content of a CD and a browser for the CD are compiled together into a single package before distribution. Compilation can increase the likelihood of software bugs being introduced into the operation of the CD. Proper quality control requires re-qualification for each version of the CD which can be time consuming. Vendor information is continuously being updated and it is difficult to constantly update the information being placed on the CD. The result is that a given version of the reference CD may not have the most recent information available to a vendor. Therefore, customers can be prevented from receiving proper information supportive of a remedy to their problem.

It would be useful to have a means of conveniently making available utilities, drivers, documents and reference materials supportive of the customers needs. It would be most useful to have materials that are easily updated and distributed to a customer.

SUMMARY OF THE INVENTION

Accordingly, the present invention provides a method and apparatus for displaying a text based markup language interface. The interface can be capable of interacting with a computer to provide reference documents, install system drivers and perform various system utilities. The interface can reference optical drives, hard disk drives, other storage medium and files available over a network, such as a local area network (LAN) or a wide area network (WAN) including the Internet.

According to one aspect of the invention a method for interacting with a computer so as to perform support functions is disclosed. The method can include forming a graphical user interface using a text markup language such as hypertext markup language (HTML), activating a user interactive control such as an icon or a hyperlink, hooking onto a hypertext link target associated with the activated user interaction control and performing an initial action responsive to the control, a uniform resource locator associated with the interactive control and the hypertext link target. This method can be programmed as the default behavior for a computer.

In addition if the target is RUN, the action can cause a file designated by the uniform resource locator to execute. The target can also trigger looking up the uniform resource locator in a database and executing a subsequent action specified in the database as relating to the uniform resource locator. Action can include for example installation of a software driver, execution of a routine to identify a device to install, execution of a disk image dialogue with a source specified in the uniform resource location or opening a folder specified in the uniform resource locator in a window.

In another aspect of the invention the uniform resource locator can reference an online document. The invention can generate a dynamic frameset and load a first page of the online document.

In still another aspect of the invention a method for interacting with a computer to install device drivers can include specifying a device identification and an operating system, searching an initialization file for a reference to the device identification and the operating system, copying device related files into file directories referenced by the operating system and merging device related files into the operating system registry. The user does not need to be familiar with hardware references nor the relevant files.

Additionally, a JIMFILE line can be identified in an initialization file; and files from a folder specified in the JIMFILE line can be deleted. A JIM line can also be identified in the initialization file so that hardware registry keys specified in the JIM line can be deleted.

In general, in another aspect, the invention features a computerized system for performing support functions. The computer system can include a graphical user interface comprising a text markup language, a user interactive control and a hypertext link target associated with the user interactive control. A computer support resource can be responsive to variables including activation of the user interactive control, a uniform resource locator associated with the interactive control and the hypertext link target. In addition, a hypertext link target can trigger looking up a uniform resource locator in a database. A subsequent action specified in the database and relating to the uniform resource locator can be executed.

In general, implementation may include a user interface written in a text markup language and invocable on a computer system. The interface can include an icon for online books to invoke a display of a user to online documentation, an icon for FAQs to invoke the display of frequently asked questions, an icon for drivers to access system drivers and installation routines, an icon for vendor contact to effectuate electronic communication with support personnel and a home icon to display an interface home page. The user interface can additionally include a text search box, an external graphic file portion and a markup language content area including hyperlinks corresponding to the icon for online books, the icon for FAQs, the icon for drivers and the icon for vendor contact.

Other implementations include a computer program residing on a computer-readable medium to effectuate the methods and interfaces discussed above. Additionally, in the case where a hypertext link target is RUN, the computer program can cause a file designated by the uniform resource locator to execute.

The details of one or more embodiments of the invention are set forth in the accompanying drawings and the description below. Implementations may provide advantages such as facilitating access to support documentation and device drivers. Other features, objects and advantages of the invention will be apparent from the description and drawings, and from the claims.

DETAILED DESCRIPTION OF THE INVENTION

Figure 1:
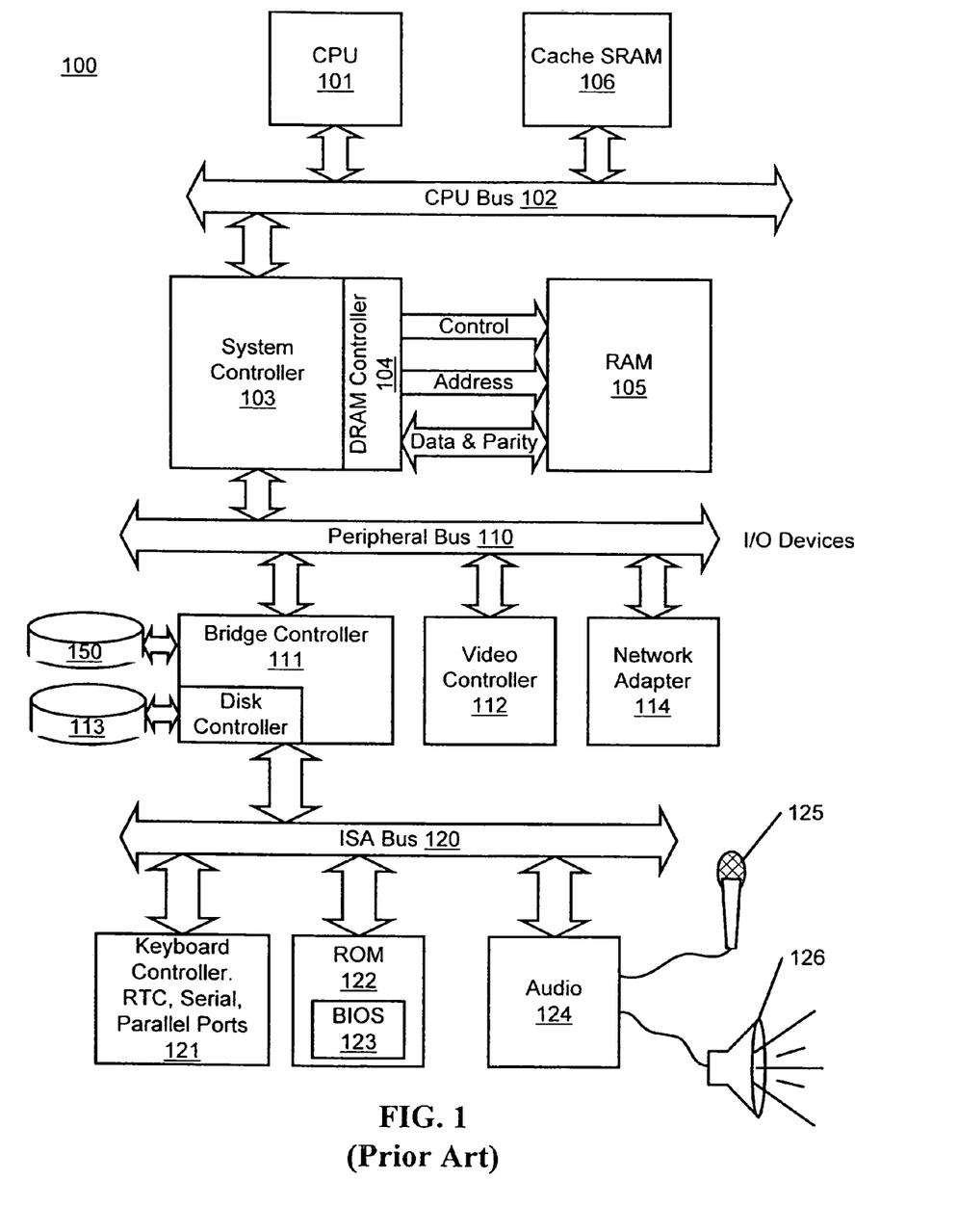
FIG. 1 illustrates a computer system according to the invention.

Referring to FIG. 1 physical resources of a computer system 100 are depicted. The computer 100 has a central processor 101 connected to a processor host bus 102 over which is provides data, address and control signals. The processors 101 may be any conventional general purpose single-chip or multi-chip microprocessor such as a Pentium® series processor, a K6 processor, a MIPS® processor, a Power PC® processor or an ALPHA® processor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to a host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 544 Mbytes/second data transfer rate to interface to a PCI bus 110 having a data path differing in data path bit width, clock speed, or data transfer rate.

Accessory devices including, for example, a video display controller 112, optical drive controller 131, such as a CD or DVD driver controller, and network controller 114 can be coupled to the peripheral bus 110. The network controller 114 may be a modem, an Ethernet networking card, a cable modem, or other network access device. A CD drive or DVD drive can connect to the optical drive controller 131. The system 100 may also include a secondary peripheral bus 120 coupled to the primary peripheral bus 110 through a bridge controller 111. The secondary peripheral bus 120 can be included in the system 100 to provide additional peripheral device connection points or to connect peripheral devices that are not compatible with the primary peripheral bus 110. For example, in the system 100, the secondary bus 120 may be an ISA bus and the primary bus 110 may be a PCI bus. Such a configuration allows ISA devices to be coupled to the ISA bus 120 and PCI devices to be coupled to the PCI bus 110. The bridge controller 111 can also include a hard disk drive control interface to couple a hard disk 113 to the peripheral bus 110.

The computer 100 can also includes nonvolatile ROM memory 122 to store basic computer software routines. ROM 122 may include alterable memory, such as EEPROM (Electronically Erasable Programmable Read Only Memory), to store configuration data. For example, EEPROM memory may be used to store hard disk 113 geometry and configuration data. BIOS routines 123 are included in ROM 122 and provide basic computer initialization, systems testing, and input/output (1/0) services. For example, BIOS routines 123 may be executed by the processor 101 to process interrupts that occur when the bridge 111 attempts to transfer data from the ISA bus 120 to the host bus 102 via the bridge 111, peripheral bus 110, and system controller 103. The BIOS 123 also includes routines that allow an operating system to be "booted" from the disk 113 or from a server computer using a local area network connection provided by the network adapter 114. An operating system 252 boot operation can occur after computer 100 is turned on and power-on self-test (POST) routines stored in the BIOS 123 complete execution, or when a reset switch is depressed, or following a software-initiated system reset. During the boot process, the processor 101 can execute BIOS 123 software to access the disk controller 111 or network controller 114 and thereby obtain a high-level operating system. Examples of high-level operating systems are, the Microsoft Windows 98™, Windows NT™, a UNIX operating system, the Apple MacOS™ operating system, or other operating system.

An operating system may be fully loaded in the RAM memory 105 or may include portions in RAM memory 105, disk drive storage 113, or storage at a network location. For example, the Microsoft Windows 98™ operating system includes some functionality that remains in memory 105 during the use of Windows 98™ and other functionality that is periodically loaded into RAM memory 105 on an as-needed basis from, for example, the disk 113. An operating system, such as Windows 98™ or Windows NT™ can provide functionality to control computer peripherals such as devices 310, 320,330,350,360,370, and 113, and to execute user applications. User applications may be commercially available software programs such as a word processor, spreadsheet, database, client software, computer aided drawing and manufacturing software, scientific software, internet access software and many other types of software. User applications may access computer system peripheral controllers 112-114, 121, and 124 through an application programming interface provided by the operating system and/or may directly interact with underlying computer system 100 hardware.

Figure 2:
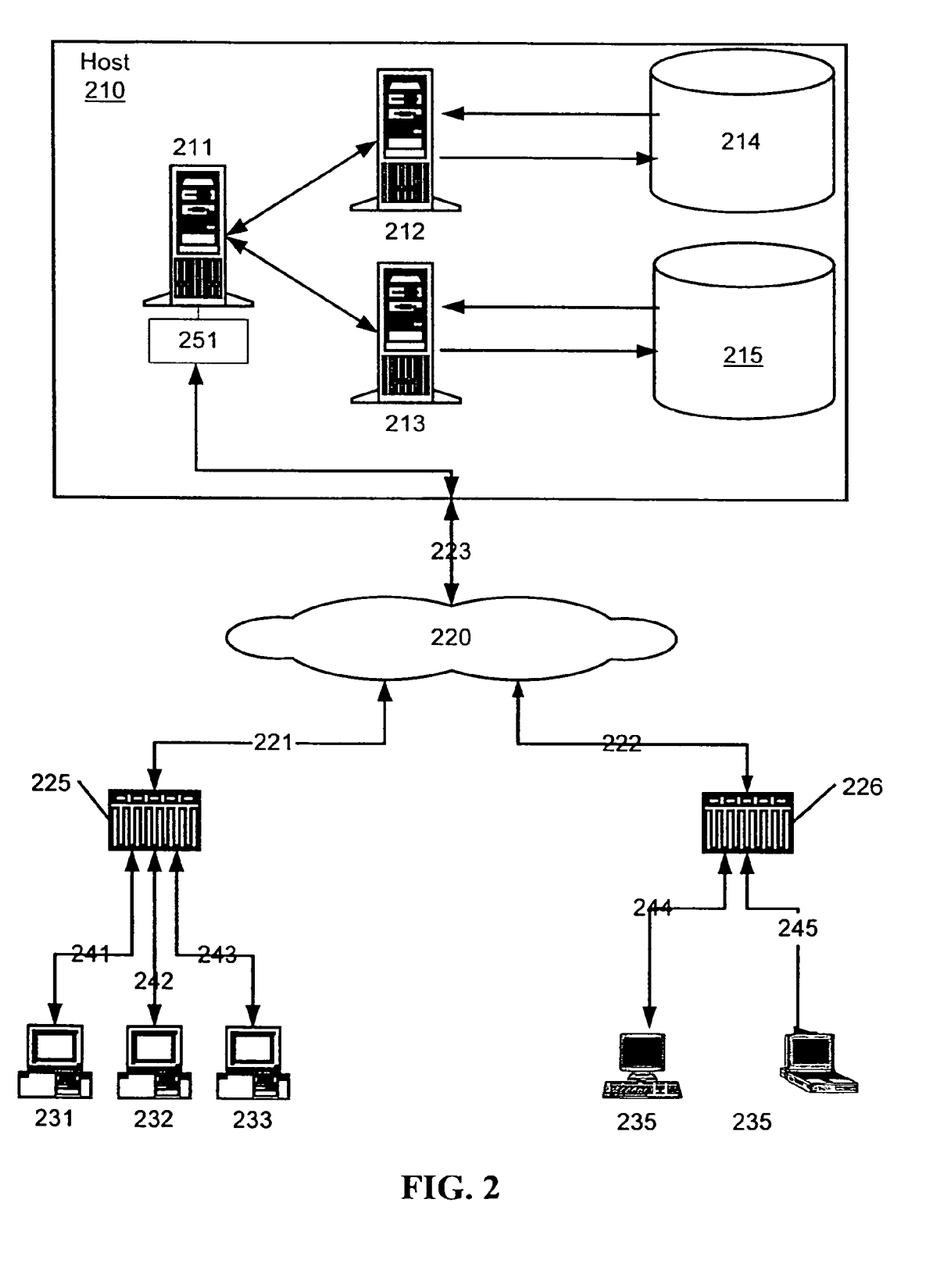
FIG. 2 illustrates a network of personal computers.

Referring to FIG. 2, a collection of computers 100 can serve as components of a computer network. A network operating system (NOS) can also be utilized as a high level operating system. A computer network 200 can include a host computer system 210 and client computers 231-236. The client computers 231-236 can communicate with the host 210 to obtain data stored at the host 210 in databases 214-215. The client computer 231-236 may interact with the host computer 210 as if the host was a single entity in the network 200. However, the host 210 may include multiple processing and database sub-systems that can be geographically dispersed throughout the network 200.

Figure 3:
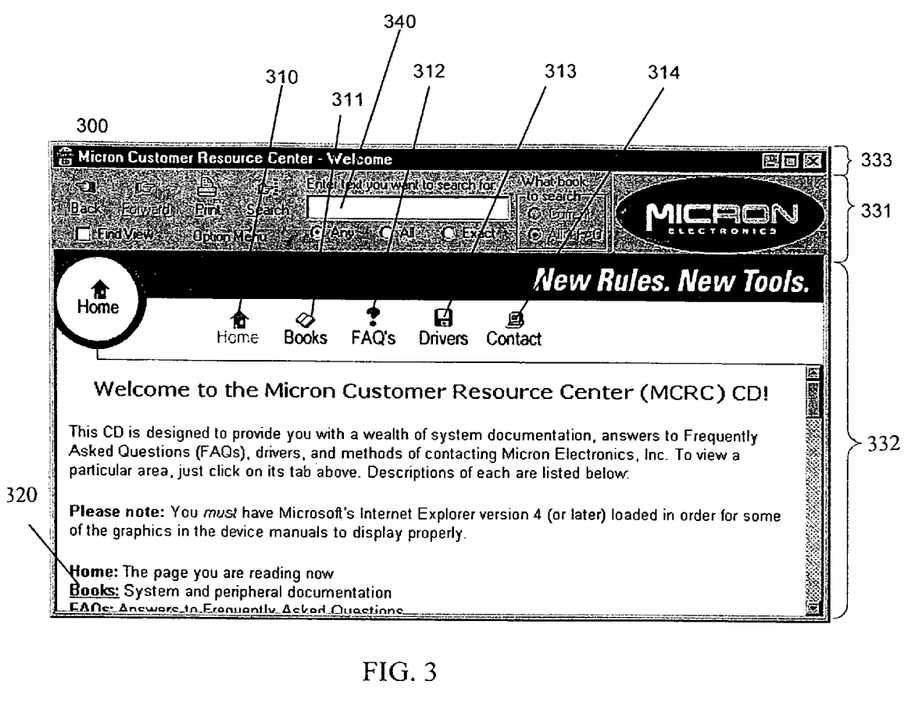
FIG. 3 is an example of a markup language interface according to the invention.

Referring now to FIG. 3, a graphical user interface 300 utilizing areas 332 written in a text markup language such as hypertext markup language (HTML), extensible markup language (XML), or standard generalized markup language (SGML) can be presented on a display of the computer 100. The interface 300 can function as a primary source of contact for a customer regarding a vendor's computer. The interface enables a user to browse hardware drivers and load the drivers into their operating system, search and read system manuals, part manuals and Technical Support Frequently Asked Questions (FAQs) and perform other utility functions.

Allowing users to access the resources available through the interface 300 directly empowers them to solve many of their technical issues and answer many questions without calling customer support. Users needs can be met expeditiously and a vendor's customer support department can be relieved of repetitive requests for help.

The markup language interface 332 facilitates the inclusion of up-to-date content and drivers. Markup language documents do not require recompilation which can introduce programming bugs and therefore also require re-qualification. The present invention uses markup language documents improved with added functionality. The added functionality can include a built in search engine, a driver lookup database, driver installation, dynamic page creation based upon hardware detection and low level operating system functionality and detection. For example hardware and software routines can display page content based on which Operating System the interface 300 is operating under, what hardware is installed on a particular machine, and system configuration settings. In addition routines can automate the installation of drivers in response to results of a lookup in a driver database or user request. Routines can also automate the removal of existing drivers, whereby conflicts can be avoided.

The interface can include an icon for books 311 to invoke the display of system and peripheral documentation, an icon for FAQs 312 to invoke the display of frequently asked questions concerning computer systems, an icon for drivers 313 to access system drivers and installation routines, an icon for vendor contact 314 to communicate electronically with support personnel and a home icon 310 to cause the display of an interface 300 home page 332. The interface 300 can also include a text search box 340 and an external graphic file portion 331. An HTML, or other markup language, content area 332 can also include a hyperlink area 320 corresponding to the icons above. Clicking a mouse button while a cursor is situated over a hyperlink, or other activation of the hyperlink, can effectuate the same response from the computer as selecting an icon bearing the same name as the hyperlink. For example, activation of a Books icon or activation of a corresponding Books hyperlink can both effectuate the same response. For this example, the response would be the display of system and peripheral documentation. Other icons and corresponding hyperlinks can also effectuate a congruent response.

Figure 4:
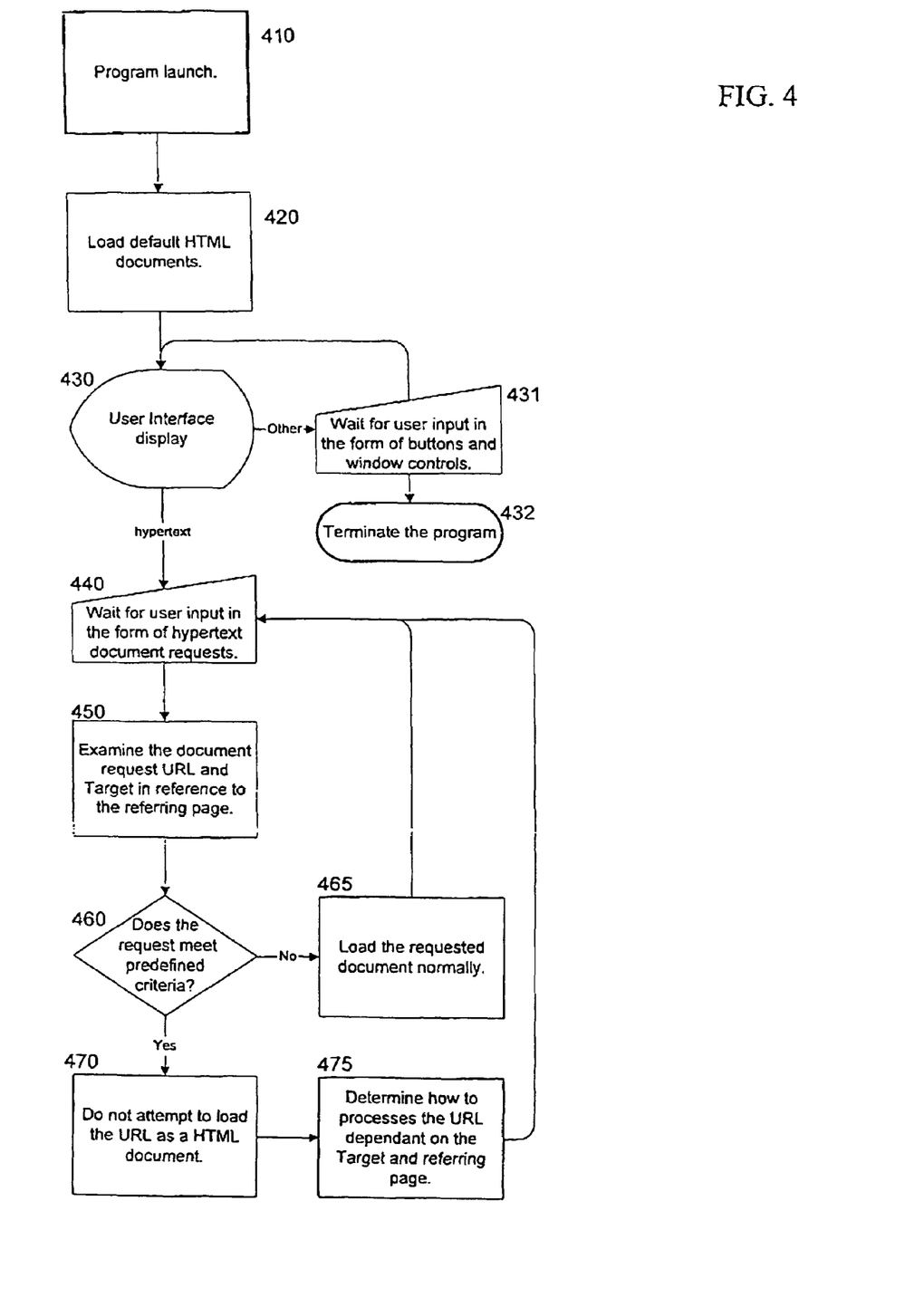
FIG. 4 illustrates a flow chart for access to a markup language reference service.

Referring now to FIG. 4, a user can cause a program launch 410 to load default HTML documents 420 causing the user interface 300 (FIG. 3) to display 430. Launching can be accomplished, for example by a user inserting a CD, clicking an icon or other interactive action. With the user interface 300 displayed 430, the next program step 431 can wait for user input in the form of buttons, icons 331 or other operating system controls 333. Execution of an operating system control to close the interface can terminate the program 432. The user interface display 430 can also wait for user input in the form of hypertext document requests 440. Execution of a hypertext request 440 can cause the program to examine a uniform resource locator (URL) and target associated with the request and in reference to the referring page 450. The program can test to see if a request meets predefined criteria 460. If a request does not meet predefined criteria the program can load the requested document normally 465. If a request does meet predefined criteria, the program can avert loading the URL as an HTML document 470 and instead determine how to process the URL dependent on the target and referring page 475. After loading and allowing a user to view a hypertext document, the system can return to a wait state for user input in the form of hypertext document requests 440.

Figure 5:
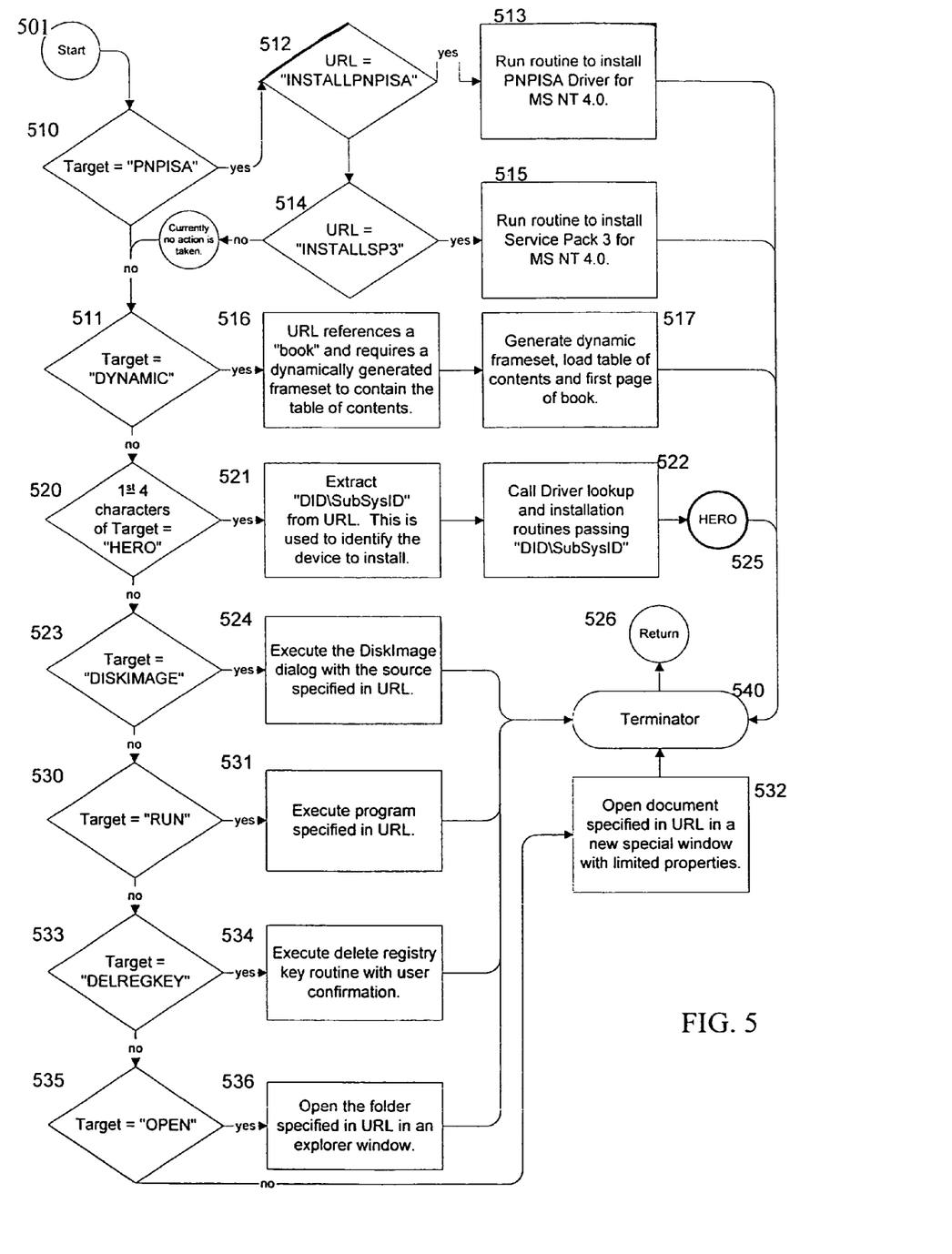
FIG. 5 illustrates a flow chart of functions available from a markup language interface.

Referring now to FIG. 5, the mark-up language interface 300 (FIG. 3) can be programmed to respond to different types of user requests. For example, user input via the user interface 300 that meets predefined criteria can be handled in a specific way. The target of an HTML or other mark-up language hyperlink can be used to direct an appropriate response to a user request loading a specific driver such as the PNPISA driver. The program can test for the target equaling PNPISA 510 and the URL equaling "INSTALL PNPISA" 512. Affirmative responses to both PNPISA tests can run a routine to install the PNPISA driver for Microsoft NT 513. If the URL does not equal PNPISA and instead equals, for instance, "Install SP3" 514, the program can run a routine to install a service pack for Microsoft NT 515.

A user may also request to view an online book, manual, or other text document. Response for a request to view an online document can result in the appropriate publication to be displayed on the users screen. For example, the program can test for the target equaling "DYNAMIC" 511. The URL can reference a book and require a dynamically generated frame set to contain a table of contents 516. The program can generate a dynamic frame set and load a table of contents and a first page of the selected book 517.

In another instance, the user may request installation of a driver that is dependant upon the hardware or software included in the computer. For this type of request, the program can test to see if the first 4 characters of the target equal to HERO 520, or some other utility program. The system can respond to a target equaling HERO by extracting a device identifier "DID" and a subsystem ID from the URL 521. The device identifier and subsystem ID information can be used to identify a correct device driver to install. The program can also call driver look-up and installation routines by passing a DID and subsystem ID along to an installation routine such as HERO 525.

Another option is for a user to request generation of a disk image. For example, the program can test to see if the target equals "DISKIMAGE" 523. In response to the target equaling "DISKIMAGE", the system can execute a DiskImage dialog with a source specified in the URL 524.

A user may also execute a program from within the user interface. To accomplish execution of a program, the system can test if the value of the target equals "RUN" 530. In response to the target equaling RUN the system can cause the execution of a program specified in the URL.

Another option that can be available to a user from the interface 300, is to delete registry entries corresponding to a particular program or device. The system can test if the value of the target equals "DELREGKEY" 533. In response to the target equaling DELREGKEY, the system can execute a delete registry key routine with user confirmation 534.

The interface 300 can also allow a user to open a folder. The program can test for the target equaling "OPEN" 535. In response to the target equaling "OPEN" the program can open a folder specified in the URL into a separate window 536. In addition the program can allow for a document to be open in a special new window with limited properties 532.

Figure 6:
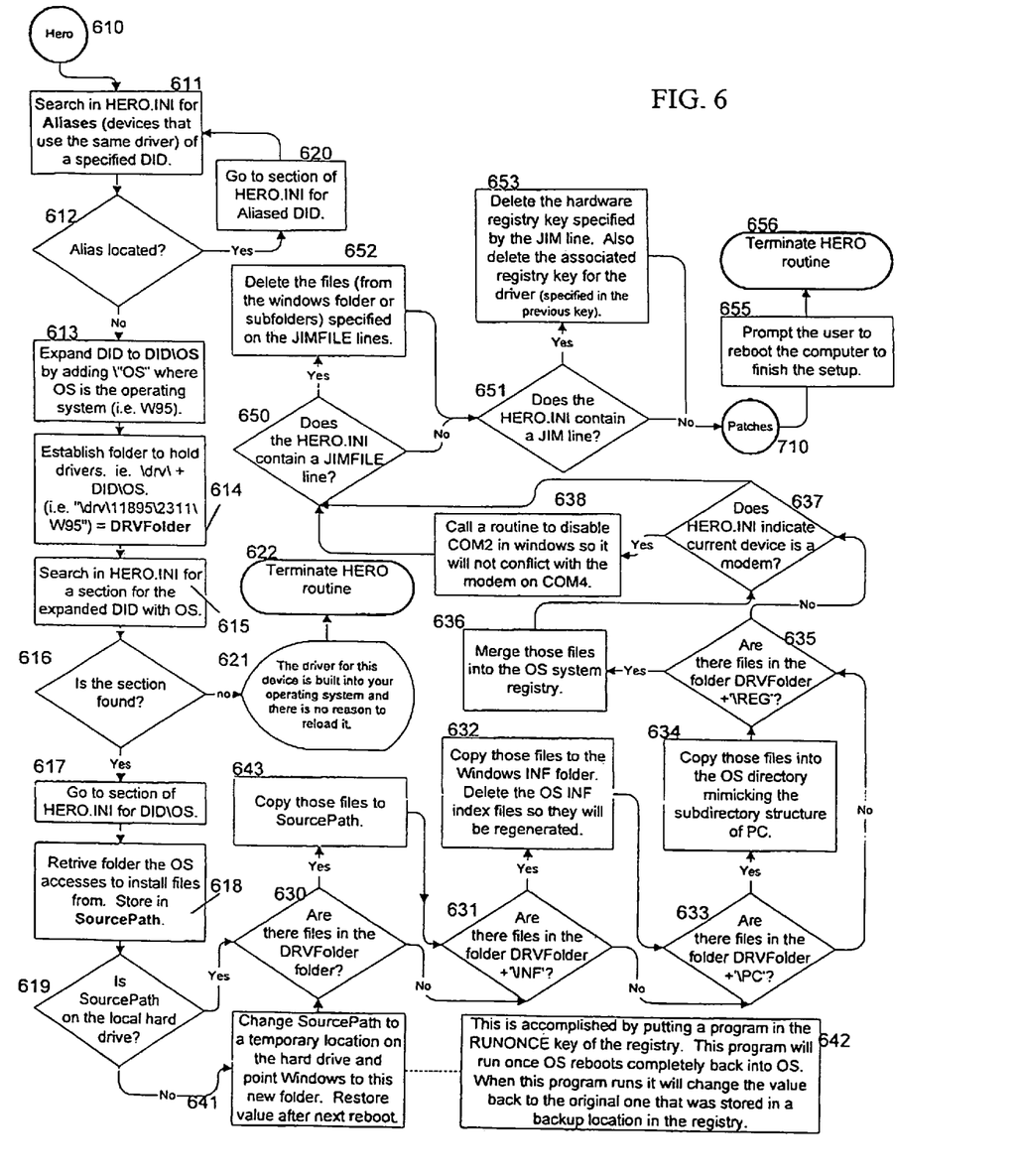
FIG. 6 illustrates a flowchart for a driver installation routine.

Referring now to FIG. 6, a separate subroutine such as HERO 610 can be used to install device drivers that are dependant upon hardware devices and/or an operating system installed in the computer. As a HERO routine commences it can search an INI file such as a HERO.INI file, a Windows INI file or other operating system INI file, for a device that uses the same driver, or an alias, of the specified DID 611. The HERO routine can test if the presence of an alias is located 612. If an alias is located, the routine can branch to the section of the HERO INI for the alias DID 620. If an alias is not located, the routine can expand the DID to DID/OS by adding an operating system 613.

A Hero routine can also establish a folder to hold drivers 614. An example of a folder can be \DRV\+DIDI+\OS, or in particular, \DRV\11895\2311\W95 614. The Hero routine can search a HERO.INI for a section with expanded DID and operating system information 615. A test can be made to see if the section is found 616. If the driver is not found it can indicate that the driver of this device is built into the operating system contained on the computer and there is no reason to reload it 621, in which case HERO will terminate its routine 622. If the section for the expanded DID with the operating system is found in the HERO.INI the routine can retrieve a folder the operating system accesses to install files, and store the correlating folder path as a variable such as SourcePath 618.

A test can be made to verify the SourcePath is located on a local hard drive 619. If the SourcePath is not located on a local hard drive the routine can change the SourcePath to a temporary location on the hard drive and point the operating system to temporary location folder 641. If the SourcePath is determined to be on a local hard drive the routine can check if there are files in a variable folder such as DRVFolder 630, and copy files located in the DRVFolder to the SourcePath 643. The files can be the same as those stored in step 614.

The routine can also check for files in a folder at the path equal to the DRVFolder+\INF 631. Files located in the DRVFolder+\INF can be copied to the operating system INF folder and the operating system INF index files can be deleted so that they can be regenerated 632.

A HERO sub routine can also test for the existence of files in a folder at a DRVFolder+\PC subdirectory. Files located at the DRVFolder+\PC subdirectory can be copied into the operating system directory mimicking the subdirectory structure of the computer 634. The routine can then test for the existence of files in a DRVFolder+\REG directory 635. Files in the DRVFolder+\REG subdirectory can be merged into the Windows system registry 636. The HERO.INI can also be tested for an indication that the current device is a modem 637. Presence of a modem can call a routine to disable COM2 in the operating system such that it can avoid conflict with a modem on a COM4 communications port 638.

Additionally the HERO.INI can be tested for the presence of a JIMFILE line 650. Files specified in JIMFILE lines can be deleted from the operating system folder or subfolders 652. Additionally the HERO.INI can be tested for the presence of a JIM Line 651. A hardware registry key specified by the JIM Line can be deleted along with an associated registry key for the driver of the specified hardware 653.

A HERO routine can also check for additional subroutines such as a Patches subroutine 710. If a Patches subroutine is present, it can be executed accordingly. Following a subroutine the user can be prompted to reboot the computer to finish setup 655, at which point the HERO routine can terminate 656.

Figure 7:
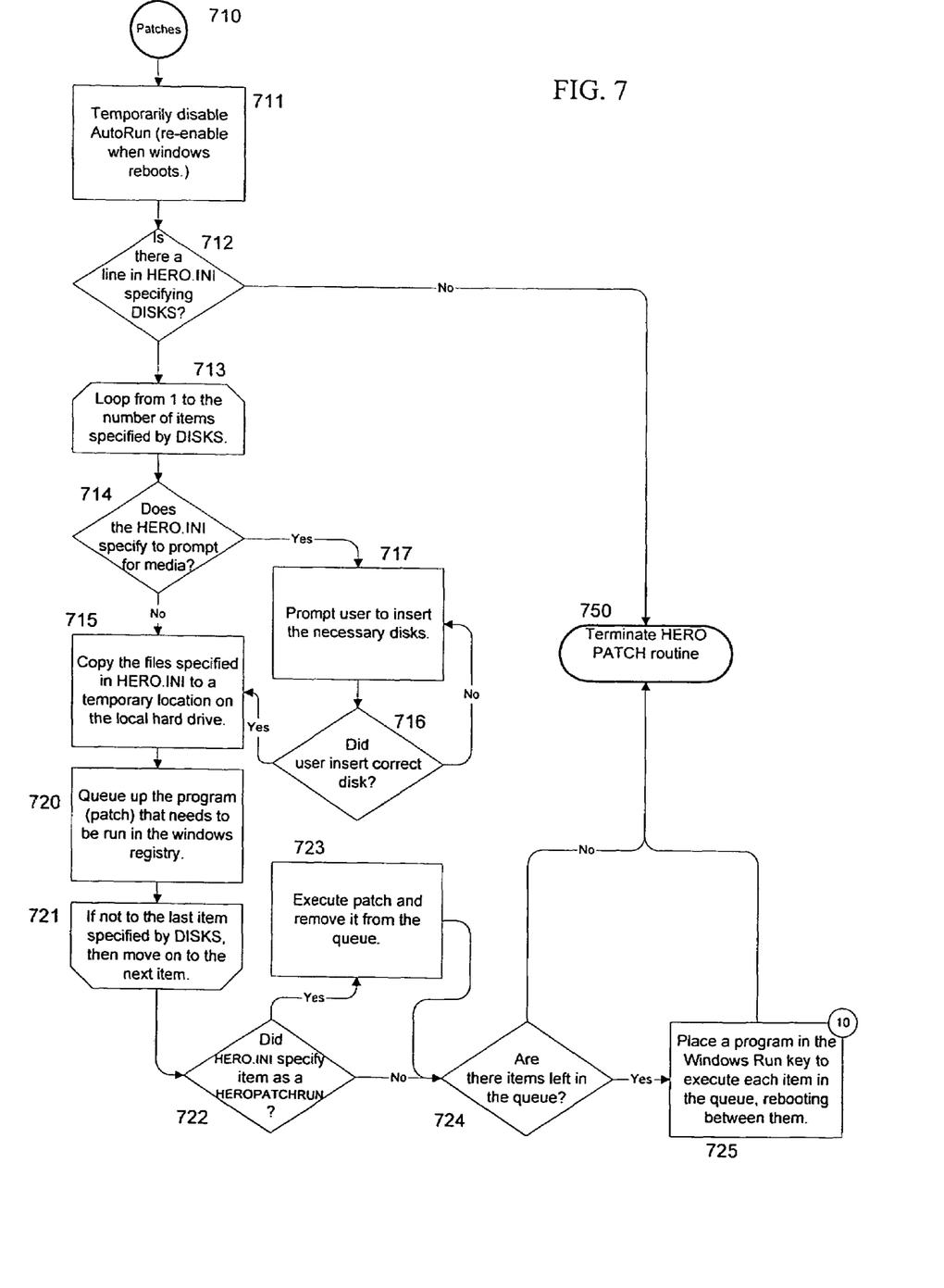
FIG. 7 illustrates a flowchart for a Patches subroutine program.

Referring to FIG. 7, a subroutine, such as a Patches subroutine 710 can be called from a HERO routine 610. The Patches routine can temporarily disable auto run and re-enable this function when an operating system reboots 711. To begin, a Patches subroutine can test for a line in the HERO.INI specifying DISKS 712. The routine can then loop from one to the number of Items specified by DISKS 713. If the HERO.INI specifies to prompt for media 714, a prompt can be displayed promoting the user to insert a necessary disk 717. Following a prompt the system can confirm that the user inserted a correct disk 716 or if the correct disk was not inserted 717. The files specified in HERO.INI can be copied to a temporary location on the local hard drive 715.

A patch program can also be queued up to run in an operating system registry 720. A patch routine can progress to a next patch program and queue up all patch programs that are specified by the DISKS 721. If the HERO.INI specifies an item as a HEROPATCHRUN 722, the routine can execute the patch and remove it from the queue 723. A queue can be checked for remaining items 724. A queuing program 810 programs can be placed in an operating system Run key such that it will execute programs remaining in the queue. Programs that have been executed can be removed from the queue. In addition the computer 100 can be rebooted between executions 725. After the queue has been emptied the HERO patch routine can terminate 750.

Figure 8:
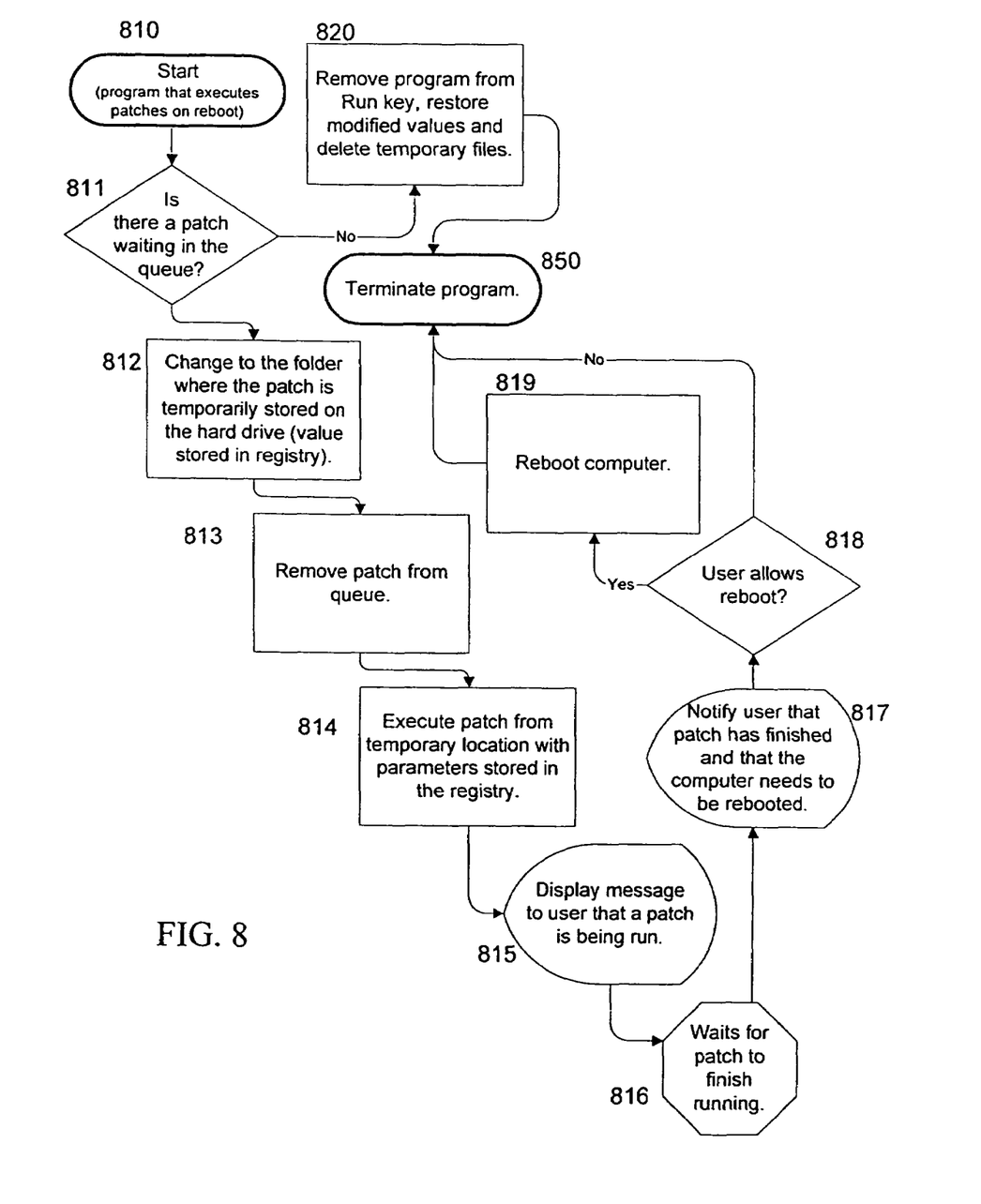
FIG. 8 illustrates a flowchart for a program to execute a Patches subroutine.

Referring now to FIG. 8, a routine to empty a patch program queue can be run to execute patch programs on reboot 810. The program can first check for a patch program waiting in a queue 811. If no patch program is waiting in the queue, a start subroutine can remove the queuing program from the Run key, restore modified values and delete temporary files 820. If a patch program is waiting in queue then a subroutine can change to a folder temporarily storing the patch 812 and remove the patch from the queue 813.

The subroutine can also execute the patch from the temporary location with parameters stored in the registry 814 and display a message to user that the patch is being run 815. The subroutine can wait until the patch is finished executing 816 and notify the user that the patch has been completed and that the computer needs to be rebooted 817. An option can be placed before the user to reboot the computer 818 whereby with the user's consent the computer is rebooted 819 and the program is terminated 850 until the next boot.

This invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output. The invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying-computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. Nevertheless, it will be understood that various modifications may be made without departing from the spirit and scope of the invention. Therefore, other implementations are within the scope of the following claims.

What is claimed is:

1. Computer readable storage media provided with instructions written in a text markup language and invocable on a computer system so as to induce the computer system to generate and present a user interface, the interface comprising:
   a display of the computer system illustrating a driver icon representing a grouping of device drivers and associated with a driver uniform resource locator (URL) and a driver target, wherein the driver icon is selected, the computer system examines the driver URL and the driver target, and determines whether to automatically access online system drivers and installation routines wherein the driver icon is automatically created and dynamically updated based on one or more of a hardware configuration, an operating system, and a configuration setting of the computer system;
   a vendor icon for vendor contact associated with a vendor URL and a vendor target, wherein the vendor icon is selected, the computer system examines the vendor URL and the vendor target, and determines whether to automatically effectuate electronic communications with support personnel;
   a patch icon for automatically executing one or more patch programs in a queue of the patch programs and wherein patch programs are removed from the queue after execution and wherein the computer system is rebooted after each execution;
   instructions to induce the computer system to generate and display a frequently asked question (FAQ) icon representing a grouping of online FAQ's and associated with a FAQ URL and a FAQ target, wherein the FAQ icon is selected, the computer system examines the FAQ URL and the FAQ target, and determines whether to automatically invoke an online display of frequently asked questions; and
   a home icon to display an interface home page.

2. The computer readable storage media of claim 1, wherein accessing system drivers and effectuating communication with support personnel is based at least in part on the operating system of the computer system.

3. The computer readable storage media of claim 1, wherein accessing system drivers and effectuating communication with support personnel is based at least in part on the hardware installed in the computer system.

4. The computer readable storage media of claim 1, wherein accessing system drivers and effectuating communication with support personnel is based at least in part on the system configurations of the computer system.

5. The computer readable storage media of claim 1, further comprising instructions to induce the computer system, when the driver icon is selected, to automatically remove existing drivers to avoid conflict on the computer system.

6. The computer readable storage media of claim 1, further comprising instructions to induce the computer system to generate and display an online books icon representing a grouping of online documentation and associated with an online books URL and an online books target, wherein if the online books icon is selected, the computer system examines the online books URL and the online books target, and determines whether to automatically invoke a display of online documentation.

7. Computer readable storage media provided with instructions written in a text markup language and invocable on a computer system so as to induce the computer system to generate and present a user interface, the interface comprising:
   means for generating and displaying a visual representation of a grouping of device drivers, the means for representing a grouping of drivers associated with a driver uniform resource locator (URL) and a driver target wherein the visual representation is automatically created and dynamically updated based on one or more of a hardware configuration, an operating system, and a configuration setting of the computer system, wherein the means for representing a grouping of drivers is selected, the computer system examines the driver URL and the driver target, and determines whether to automatically access online system drivers and installation routines;
   means for generating and displaying a visual representation of a vendor contact, the means for representing vendor contact associated with a vendor URL and a vendor target, wherein the means for representing vendor contact is selected, the computer system examines the vendor URL and the vendor target, and determines whether to automatically effectuate electronic communication with support personnel;
   means for generating and displaying a visual representation for automatically executing one or more patch programs in a queue of the patch programs and wherein patch programs are removed from the queue after execution and wherein the computer system is induced to reboot after each execution;
   means for generating and visually representing a grouping of online frequently asked questions (FAQ's), the means for representing a grouping of online FAQ's associated with a FAQ URL and a FAQ target, wherein the means for representing a grouping of online FAQ's is selected, the computer system examines the FAQ URL and the FAQ target, and determines whether to automatically invoke an online display of frequently asked questions; and
   means for displaying an interface home page.

8. The computer readable storage media of claim 7, wherein accessing system drivers and effectuating communication with support personnel is based at least in part on the operating system of the computer system.

9. The computer readable storage media of claim 7, wherein accessing system drivers and effectuating communication with support personnel is based at least in part on the hardware installed in the computer system.

10. The computer readable storage media of claim 7, wherein accessing system drivers and effectuating communication with support personnel is based at least in part on the system configurations of the computer system.

11. The computer readable storage media of claim 7, further comprising instructions to induce the computer system, when the means for representing a grouping of drivers is selected, to induce the computer system to automatically removes existing drivers to avoid conflict on the computer system.

12. The computer readable storage media of claim 7, further comprising means for generating and visually representing a grouping of online documentation, the means for representing a grouping of online documentation associated with an online books URL and an online target, wherein if the means for representing a grouping of online documentation is selected, the computer system examines the online books URL and the online books target, and determines whether to automatically invoke a display of online documentation.

13. A computer readable media having a computer program written in a text markup language residing on the computer readable media and invocable on a computer system, the computer readable media comprising:

computer code configured to induce a client computer system to automatically generate and display a driver icon representing a grouping of drivers and associated with a driver uniform resource locator (URL) and a driver target wherein the driver icon is automatically created and dynamically updated based on one or more of a hardware configuration, an operating system, and a configuration setting of the computer system, wherein the driver icon is selected, the computer code is configured to examine the driver URL and the driver target, and configured to determine whether to automatically access online system drivers and installation routines;

computer code configured to display a vendor contact icon and associated with a vendor URL and a vendor target, wherein the vendor contact icon is selected, the computer code is configured to examine the vendor URL and the vendor target, and configured to determine whether to automatically effectuate electronic communication with support personnel;

computer code for automatically executing one or more patch programs in a queue of the patch programs and wherein patch programs are removed from the queue after execution and wherein the computer system is rebooted after each execution;

computer code configured to display a frequently asked question (FAQ) icon representing a grouping of online FAQ's and associated with a FAQ URL and a FAQ target, wherein the FAQ icon is selected, the computer code is configured to examine the FAQ URL and the FAQ target, and configured to determine whether to automatically invoke an online display of frequently asked questions; and computer code configured to display an interface home page.

14. The computer readable media of claim 13, wherein accessing system drivers and effectuating communication with support personnel is based at least in part on the operating system of the computer system.

15. The computer readable media of claim 13, wherein accessing system drivers and effectuating communication with support personnel is based at least in part on the hardware installed in the computer system.

16. The computer readable media of claim 13, wherein if the driver icon is selected, the computer code is configured to automatically remove existing drivers to avoid conflict on the computer system.

17. The computer readable media of claim 13, further comprising computer code configured to display an online books icon representing a grouping of online documentation and associated with an online books URL and an online target, wherein if the online books icon is selected, the computer code is configured to examine the online books URL and the online books target, and configured to determine whether to automatically invoke a display of online documentation.

* * * * *

UNITED STATES PATENT AND TRADEMARK OFFICE
CERTIFICATE OF CORRECTION

PATENT NO. : 7,523,400 B2
APPLICATION NO. : 11/595390
DATED : April 21, 2009
INVENTOR(S) : McKeeth

It is certified that error appears in the above-identified patent and that said Letters Patent is hereby corrected as shown below:

On the Title page, in Item (56), under "Other Publications", in column 2, line 1, delete "Brandy," and insert -- Bandy, --, therefor.

In column 11, line 13, in Claim 11, delete "removes" and insert -- remove --, therefor.

Signed and Sealed this

Eleventh Day of August, 2009

David J. Kappos
*Director of the United States Patent and Trademark Office*